Patented Sept. 22, 1953

2,653,170

UNITED STATES PATENT OFFICE 2,653,170

DODECENYLCYCLOHEXYLAMINES

Richard S. Cook, Rockledge, and W E Craig, Philadelphia, Pa., assignors to Rohm & Haas Company, Philadelphia, Pa., a corporation of Delaware No Drawing. Application June 26, 1952,
Serial No. 295,842

3 Claims. (Cl. 260—563)

The invention relates to amines having dodecenyl and cyclohexyl groups as N-substituents. In particular it relates to amines of the structure

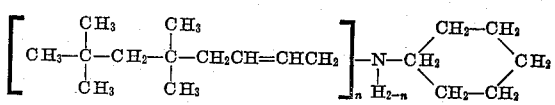

where $n$ has a value from one to two. These compounds are active fungicidal and insecticidal agents for use in agricultural and horticultural preparations for combatting plant diseases and infestations of insects and the like.

These compounds are prepared by reacting a 1-halo-5,5,7,7-tetramethyl-2-octene and cyclohexylamine. The reaction is conveniently carried out in an inert solvent, such as naphtha, benzene, toluene, xylene, or the like. If excess cyclohexylamine is used, it forms an amine hydrochloride, which can be separated from the reaction mixture. If the reactants are used in equivalent amounts, the hydrochloride which results can be converted to the free amine by treating with an equivalent amount of an inorganic base, such as sodium hydroxide. If more than an equivalent of the dodecenyl chloride or bromide is used, there is formed bis(5,5,7,7-tetramethyl-2-octenyl)cyclohexylamine along with (5,5,7,7 - tetramethyl - 2 - octenyl)cyclohexylamine. The reaction products can be used as obtained, being chiefly the above secondary amine or the above tertiary amine or mixtures thereof. The two kinds of amines can be separated and purified by distillation.

The starting dodecenyl halide is obtained from 1,1,3,3-tetramethylbutyl chloride or bromide by reaction with butadiene in the presence of a Friedel-Crafts catalyst at a temperature between —10° and 90° C. Details of this preparation are given in Application Serial No. 198,740, filed December 1, 1950, by Warren D. Niederhauser, in the hands of a common assignee.

Typical preparations follow to illustrate a convenient method for preparing the dodecenylcyclohexylamines of this invention. Parts are by weight.

Example 1

There were mixed 71 parts of 1-chloro-5,5,7,7-tetramethyl-2-octene, 59.3 parts of cyclohexylamine, and 255 parts of toluene. This mixture was heated under reflux for 16 hours. The reaction mixture was cooled with separation of cyclohexylamine hydrochloride. This was separated by filtration. The filtrate was washed with water and dried over magnesium sulfate. Toluene was removed by distillation and the residual oil was fractionally distilled. At 143°–150° C./1.6 mm. there was taken a fraction of 34 parts which corresponded in composition to N-(5,5,7,7-tetramethyl-2-octenyl)cyclohexylamine. The fraction contained 5.20% of nitrogen (theory 5.26%).

A 2% solution of this compound in deodorized kerosene gave a knockdown of flies in a Peet-Grady test of 68% and a kill of —2 compared to the official test insecticide. A solution in kerosene of 1% of the compound and 25% of official test insecticide gave a knockdown of 98% and a kill of +6 compared to the official test insecticide.

An emulsifiable concentrate was made from dodecenylcyclohexylamine using 50 parts of this compound, 45 parts of methylated naphthalenes, and 5 parts of an oil-soluble emulsifier, an octylphenoxypolyethoxyethanol. Sprays prepared by diluting this concentrate with water were applied to bean plants infested with black bean aphids. At a dilution of toxicant of 1 to 800 a 100% kill resulted, at 1 to 1600 an 89% kill, and at 1 to 16,000 a 60% kill. A dust was prepared containing 5% of the above compound. It was likewise applied against the black bean aphid. A kill of 83% was obtained after 24 hours.

Against milk weed bug the emulsion concentrate gave a 100% kill at a dilution of 1 to 400.

At a dilution of emulsion concentrate giving one pound of toxicant per 100 gallons of spray a 97% kill of red spiders was obtained. A 5% dust gave a kill of 99% against red spiders, while a 3% dust gave a kill of 91%.

In standard fungitoxicity tests the above compound at 0.0005% gave 100% inhibition of germination of spores of Macrosporium sarcinaeforme.

Tests for phytotoxicity on tomato, broad bean, and sweet potato were essentially negative.

Example 2

There were mixed 80 parts of 1-chloro-5,5,7,7-tetramethyl-2-octene, 60 parts of cyclohexylamine, and 260 parts of toluene. The mixture was heated under reflux for about 20 hours. The mixture was cooled. Amine hydrochloride separated and was removed by filtration. The filtrate was washed and dried over soluble anhydrite. Toluene was distilled off and the residual oil was fractionally distilled. At 142°–148° C./1.5 mm. dodecenylcyclohexylamine was taken off. At 217°–220° C./1 mm. there was obtained a fraction amounting to about 60 parts of a yellow oil and containing 3.2% of nitrogen. It was bis- (5,5,7,7 - tetramethyl - 2 - octenyl) cyclohexylamine, for which the theoretical nitrogen content is 3.25%.

A 1% solution of this compound in deodorized kerosene with 25% of official test insecticide gave a knockdown of 84% and a kill of +17.

An acetone solution was diluted with water to give a spray containing one part of the above compound in 400 parts of water. It was applied against black bean aphids on beans. The kill at 24 hours was 74%. Against red spiders this spray gave a 100% kill.

An emulsifiable concentrate was prepared as above and tested against red spiders. At a dilution of 1:800 it gave a kill of 82%, at 1:1600 a kill of 74%, and at 1:3200 a kill of 63%.

Against Mexican bean beetles a spray from the emulsifiable concentrate at a dilution of toxicant of 1:100 gave a kill of 100%. A 3% dust gave a kill of Mexican bean beetles of 100%.

We claim:

1. As new substances, compounds of the structure

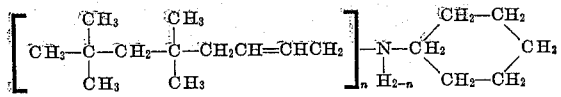

where $n$ has a value of one to two.

2. As a new chemical compound, (5,5,7,7-tetramethyl-2-octenyl) cyclohexylamine.

3. As a new chemical compound, bis(5,5,7,7-tetramethyl-2-octenyl) cyclohexylamine.

RICHARD S. COOK.
W E CRAIG.

No references cited.